United States Patent [19]
Chapman

[11] Patent Number: 5,900,305
[45] Date of Patent: May 4, 1999

[54] LAMINATED HIGH EFFICIENCY FILTER

[76] Inventor: Rick L. Chapman, 1977 Valley Meadow, Oak View, Calif. 93022

[21] Appl. No.: 08/818,630

[22] Filed: Mar. 14, 1997

Related U.S. Application Data

[60] Provisional application No. 60/036,721, Jan. 24, 1997.

[51] Int. Cl.[6] .............................. B32B 27/14; B32B 31/16

[52] U.S. Cl. ............................ 428/198; 442/36; 442/392; 442/400; 156/73.1; 156/290; 156/308.2

[58] Field of Search ................................ 428/198; 442/36, 442/392, 400; 156/73.1, 290, 308.2

[56] References Cited

U.S. PATENT DOCUMENTS

| | | | |
|---|---|---|---|
| 5,240,479 | 8/1993 | Bachinski | 55/103 |
| 5,283,106 | 2/1994 | Seiler et al. | 428/198 |
| 5,306,534 | 4/1994 | Bosses | 428/35.2 |

*Primary Examiner*—Christopher Raimund
*Attorney, Agent, or Firm*—Marvin E. Jacobs

[57] ABSTRACT

Electrostatic fibers with high efficiency for small particles and low pressure drop are formed by spot laminating an assembly of a stack of at least 2 layers of thermoplastic, electrostatic, non-woven media having lightweight scrims disposed on each end face of the stack between the nip of a roller with a pattern of raised dots and a heated roller or ultrasonic generator.

14 Claims, 3 Drawing Sheets

LAMINATED HIGH EFFICIENCY FILTER

CROSS-REFERENCE TO DISCLOSURE DOCUMENT

This application relates to the invention disclosed in Disclosure Document No. 401,437 filed Jun. 20, 1996. Retention of the Disclosure Document is respectfully requested. The present application is a complete application of provisional application Ser. No. 60/036,721 filed Jan. 24, 1997.

TECHNICAL FIELD

This invention relates to high efficiency filters and, more particularly, this invention relates to thermally laminated, synthetic resin filters such as HEPA, ULPA filters and filters used in medical breathing apparatus.

BACKGROUND OF THE INVENTION

The recognition of the adverse effects of inhaled particles especially particles in the sub 10 micron range has led to the development of filter to remove these particles from air streams. These filters are commonly designated as HEPA (High Efficiency Particulate Air) and ULPA (Ultra Efficiency Particulate Air) filters.

Although the acronym, HEPA was not used until the late 1940's, filter media that could satisfy the minimum HEPA high performance characteristics were produced in the late 1930's. A filter material containing crocidolite asbestos in a coarse fiber matrix provided adequate performance with a single layer of media. This media was improved in the early 1940's by the National Defense Research Committee (NDRC) to provide several magnitude of order improvement in performance. Enhanced evaluation techniques also contributed to the development of more effective filters. During the same period, many alternate fine fibers were tested for use in fine particle filters including other types of asbestos, glass wool, rock wool and some organic fibers. HEPA grade filter media was manufactured from all of these filters. However, a media formed of a matrix of asbestos fibers combined with paper fibers was found to be the best for rapid, large scale commercial production. This material was the first to be designated a HEPA media.

After World War II, this industry grew at a dramatic pace driven by the nuclear arms race. The possibility of mutual assured destruction created the need to filter radioactive particles from air breathed by personnel as well as the requirement to remove radioactive particles from the processing environment. Efforts were concentrated on improving performance of the asbestos-matrix fiber media as well as searching for domestic substitutes for the previously imported fibers. A number of natural grasses and regenerated cellulose viscose fibers were found to be suitable substitutes for the matrix fibers. However, only asbestos fibers were utilized as the filter media. In the later 1940's, glass microfibers were developed. They were only available in small quantities for research. The Naval Research Laboratory (NRL) explored the use of glass microfibers in the development of a 100 percent inorganic paper. Pilot production of glass paper began at the National Bureau of Standards (NBS). Full scale production of glass paper began in 1952.

Shortly after the development of microfiber glass paper, a fire occurred in a filtration system at an Atomic Energy Commission (now DOE) using asbestos fiber media containing combustible matrix fibers. The fire was extremely hazardous in widely dispersing the asbestos fibers as an aerosol throughout the facility. It was later discovered that inhaled asbestos fibers were a latent carcinogen. This caused the industry to substitute glass microfibers in HEPA filter media.

Over the next two decades (1955–1975), there were only modest improvements in HEPA media and essentially all of these were in improved performance of the media. This lull resulted from satisfaction with existing media, existence of a substantial nuclear weapon stockpile, and a diversion of funding and research activity to higher priority projects.

However, from 1975 forward, the fast growth of industries such as integrated circuits, microelectronics, and biological industries requiring clean room manufacturing facilities created the need for new media having several orders of magnitude improved performance.

The most common commercial Intermediate Efficiency HEPA and ULPA (Ultra Low Penetration Absolute) media grades sold worldwide are composed of borosiliate glass microfibers bound together by an acrylic resin. However, as recently as 1994, the ASHRAE (American Society of Heating Refrigeration and Air-Conditioning Engineers) industry stopped using glass media and converted to the use of organic fiber media due to concerns with glass fibers dislodging from the media, becoming airbound and inhaled.

The most commonly used organic media is formed from melt blown media and particularly melt blown media that carries an electrostatic charge. Several weights of media are available from several suppliers. Weights range from 10 to 80 grams per square yard. Randomly charged melt blown electrostatic media were tested in accordance with the invention. The pressure drop and efficiencies were not satisfactory to be used to replace the following commercial filters.

TABLE 1

| Type | Capture | Particle/Micron |
|---|---|---|
| Intermediate Efficiency | at least 95% | 0.30 |
| HEPA | at least 99.97% | 0.30 |
| ULPA | at least 99.999% | 0.12 |

The medical industry has also adopted electrostatic media for use in filters for spirometry, anesthetic gas, pulmonary function, CPAP sleep apnea apparatus, incubation, respiratory care, breathing circuits and ventilation. The electrostatic media used for these applications is a fibrous, thermo plastic organic media. This media is supplied in grades from 15 grams per square yard to 300 grams per square yard. It is backed with a Nylon or Polyester scrim of from about 0.1 to about 1.0 ounces per square yard on at least one side, preferably both sides and sealed along all its outer edges.

The electrostatic fiber material is formed into a needle-punched, non-woven fabric capable of 99.9% efficiency in the removal of particles from 0.1 to 0.5 microns. Preferably the fibers are organic, thermoplastic mixture of a polyalkylene fiber such as polypropylene and an anionically substituted acrylic fiber. The needle-punched material is very open and some of the fibers are loose and can be dislodged from the fabric. In the manufacture of the fabric for medical applications the fibers are needled together to a layer of scrim material on the lower side. A top layer of scrim is then applied to the needled fabric to assure retention of loose fibers. The top layer seals the edges of the assembly. The efficiencies of these filters need improvement and the edge sealing operation is inefficient and increases the cost of manufacture of the media.

STATEMENT OF THE PRIOR ART

Prior patents on electret materials used for filter media disclose several methods of charging the media. Many of the prior patents are concerned with forming charged sheets of electret media with oriented charges and stacking them to form polarized media with like charged surfaces facing each other or opposed surfaces having opposite charges such as Ando, et al. (U.S. Pat. No. 4,874,659) which stacks media with oriented charges to increase life span of the charge density of the electrostatic media. The sheet can be readily delaminated and melt blown media is not preferred (comparative Example 4). Yamasaki (U.S. Pat. No. 4,513, 049) laminates an even number of sheets with oriented charges with surfaces having like charge facing each other by rolling and pressing a stack of the sheets. Deeds (U.S. Pat. No. 5,122,048) discloses a method of charging extruded polymer fiber by discharging electrically charged hot air onto the fibers. Togashi, et al. (U.S. Pat. No. 5,051,159) forms non-woven, electret sheets having a large amount of polarized charges by directing the fibers onto a collecting surface within an electric field.

Moosmayer (U.S. Pat. No. 4,904,174) discloses apparatus for electrically charging melt blown fibers which includes electrodes spaced from the melt blowing die. Inoue, et al. (U.S. Pat. No. 4,626,263) discloses an electret media formed of a mixture of polar polymer, non-polar polymer and a minor amount of a third polymer modified with an unsaturated carboxylic acid. Nakao (U.S. Pat. No. 4,592,815) forms an electret sheet by feeding non-woven fabric between electrodes while being highly pressed. Forrest, Jr. (U.S. Pat. No. 4,534,918) uses conductive pins on a secondary electrode projecting toward a primary electrode to enhance electrostatic pinning forces. Wadsworth, et al. (U.S. Pat. No. 4,375,718) forms an electret web by covering each side of a non conductive fiber web with a more conductive web and charging the assembly. A film web is charged by the Kolbe, et al. (U.S. Pat. No. 4,239,973) by means of a corona discharge. Kubik, et al. (U.S. Pat. No. 4,215,682) teach introducing a persistent electric charge into melt blown fibers during the melt blowing process. Tsai, et al. (U.S. Pat. No. 5,401,446) charges a web or film between a single bar electrode and the curved surface of a second electrode and then subjects the field or film to subsequent electric fields of opposite polarity to that of the film.

STATEMENT OF THE INVENTION

It has been discovered according to the present invention that the manner of charging a media is not determinative of efficiency and pressure drop of the media. The degree of efficiency and the pressure drop of layered media can be precisely tailored in accordance with the invention. What has been discovered is that each weight of a certain media has a pressure drop and efficiency with respect to air streams containing submicron particles. However, when the media are stacked, it has been found that a single layer of material had higher resistance and lower efficiency than a stack of layers having the same over all weight. For example, a single layer of 40 gram per square yard melt blown electrostatic media had a higher resistance and lower efficiency than a stack of 2 layers of 20 gram per square yard material. The same is true for three layers of 20 gram per square yard material or 2 layers of 30 gram per square yard material versus a single layer of 60 gram per square yard media. This effect appears to be applicable to all types of melt blown filtration media irrespective of the charging method, but appears to be most applicable to randomly charged media.

A further feature of the invention is the discovery that by selectively forming a stack of layers of melt blown electrostatic media having different weights, efficiencies of at least 95% of 0.3 micron particles and a least 99.999% of 0.12 micron particles are readily achieved with about ⅓ the resistance to air flow as a single layer of media of the combined weights of the layers.

The layers can move laterally with respect to each other. Combining the layers by needle punching is not possible since the apertures created would allow passage of submicron particles. Cold calendaring does not provide any adhering of the layers. It was believed that thermal bonding would detrimentally effect efficiency of collecting submicron particles and increase the resistance to air flow. It was surprisingly discovered in accordance with this invention that thermal bonding by placing the stack of layers between heated contact surfaces or by application of ultrasonic energy does not detrimentally effect either efficiency or pressure drop, especially when the bonding is effected in a pattern of discrete dots across the surface of the stack of layers.

The exposed top and bottom surfaces of the stack of layers have random fibers extending from the surfaces giving the product a hairy look and feel. The thermal contact lamination process of the invention simultaneously smoothes the upstanding fibers to provide a silk-like finish to the laminate.

Other aspects of the invention relate to provision of an optional outside protective layer of a spunbound scrim. Antimicrobial properties can be added by inserting an antimicrobial spunbound scrim between layers of the melt blown media.

It also has been discovered that stacking and spot laminating layers of organic fiber electrostatic media also increases efficiency of the media without significantly effecting pressure drop. Spot laminating the stack of media eliminates the need to seal the edges of the media or the scrim layers at the top and bottom of the stack of fabric. Ultrasonic bonding is preferred for laminating the layers of fabric together. A one-half to one inch pattern of small dots is sufficient to hold the layers together without increasing resistance to air flow. Also the lamination prevents the fibers from migrating from the surface of the media.

These and many other features and attendant advantages of the invention will become apparent as the invention becomes better understood by reference to the following detailed description when considered in conjunction with the accompanying drawings.

DETAILED DESCRIPTION OF THE INVENTION

The sheets of non-woven, melt blown electrostatic organic webs or the needle-punched, electrostatic organic fabric have a weight of from 5 to 80 grams per square yard, preferably 10 to 60 grams per square yard. The organic webs are formed from non-conductive, thermoplastic resins, preferably non-polar polyoletins containing 2 to 8 carbon atoms, usually polyethylene or polypropylene. The webs can be charged during or after web formation and usually have random charges distributed throughout the web. These materials are commercially available.

The high efficiency, low pressure drop media of the invention contains 2 to 20, preferably 4–14 layers of the nonconductive, non-polar webs or needle-punched fabric each having a weight of at least 15–100, preferably 10–60 grams per square yard. An optional protective layer of spun bound polypropolyene, polyester or linear polyamide (Nylon) having a weight of 0.5 to 3.95 ounces per square yard (OPSY) may be present at one or both outside surfaces of the composite media. A layer of antimicrobial thermoplastic scrim such as polypropylene having a weight of 0.05 OPSY to 0.2 OPSY impregnated with a quatermary amine agent may be present between some or all of the layers of melt blown web or the fabric.

The composite filter media is prepared by spot thermal laminating a stacked assembly of the melt blown webs under pressure. The melting of the fibers can be induced by applying heat or sonic energy to the assembly of webs. It is found most efficient to simultaneously apply heat and pressure to the web assembly by simultaneously passing a plurality of individual webs into the nip between two heated rollers heated to within ±5 to 10° F. of the melting point of the resin forming the web and below the temperature at which the web is scorched. Assemblies of electrostatic fabric are preferably spot laminated by passing the assembly into the nip between a patterned roller and ultrasonic heaters.

The nip clearance is sufficient to compress the assembly as it passes between the rollers or the roller-ultrasonic heat. Once the assembly exits the rollers or the ultrasonic apparatus, the stack returns to near its original thickness except at the point or spot bonded areas. Thus, the depth dust loading properties are not substantially effected.

Also the spot lamination does not significantly decrease the efficiency of the media with respect to capture of submicron particles or significantly contribute to pressure drop of the media. The size of the spots are made very small such as no more than ¼ inch in diameter usually about ¹⁄₁₆ inch in diameter and they are deployed in lines with interdot spacing of at least ¼ inch. The percentage of the area of the sheet occupied by the dots is no more than 5% and preferably less than 2%.

Figure 1:
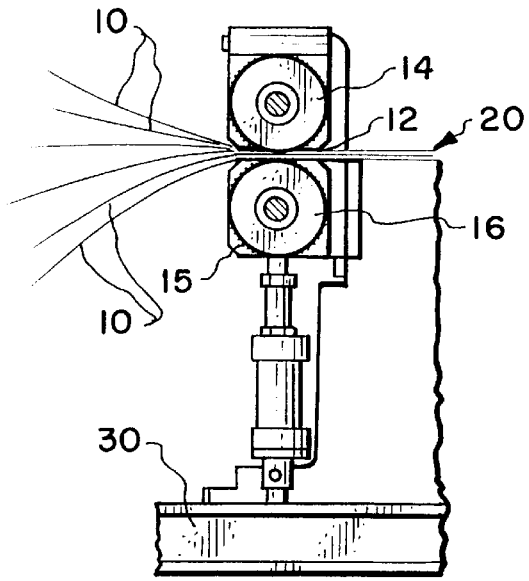
FIG. 1 is a side view in elevation of the rollers used to form the media of the invention.
Figure 3:
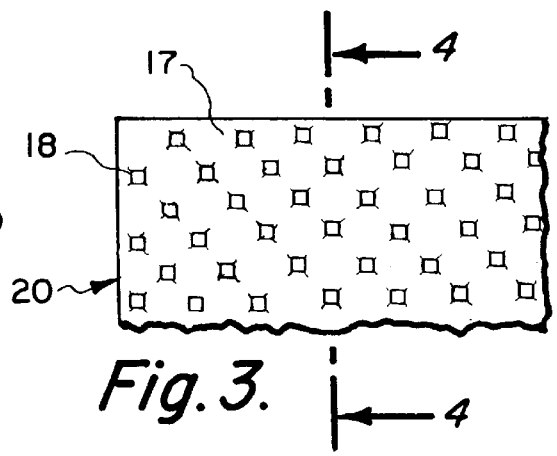
FIG. 3 is a top view of the filter media of the invention.
Figure 4:
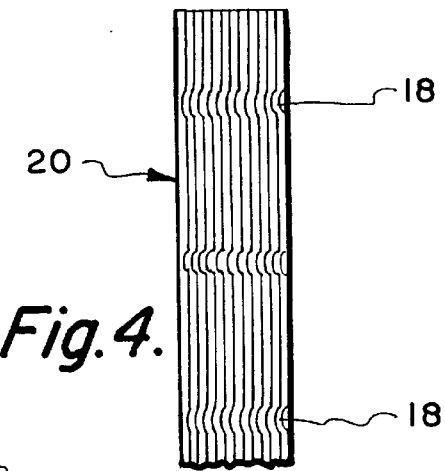
FIG. 4 is a view in section taken along lines 44 of FIG. 3.
Figure 2:
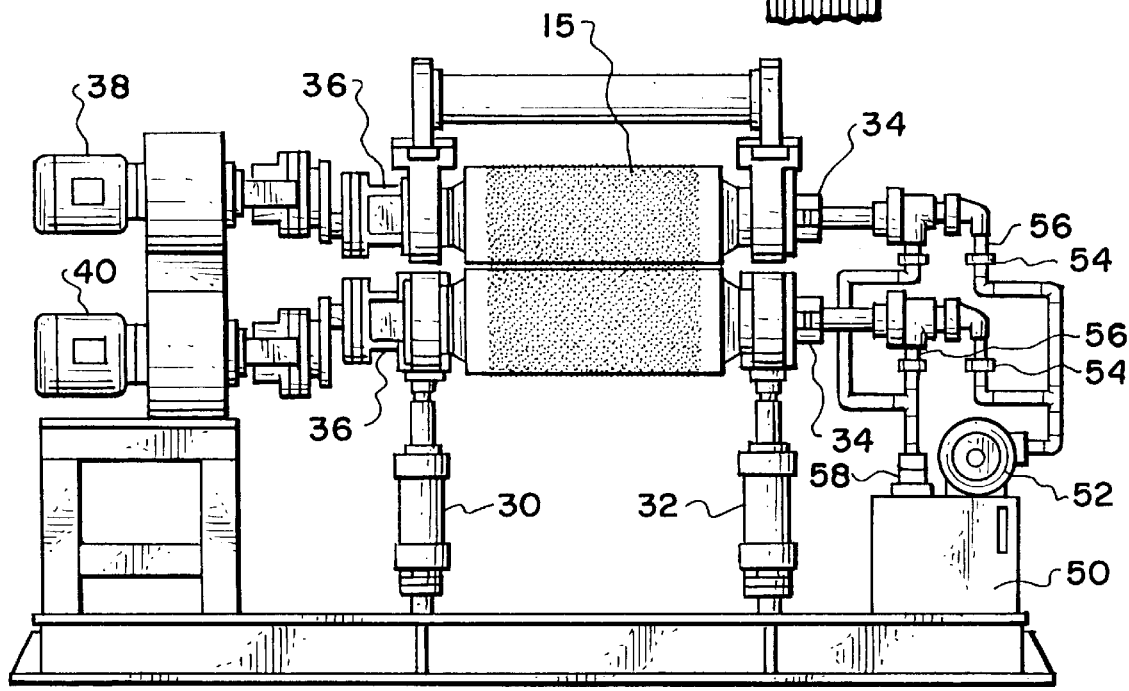
FIG. 2 is a front view in elevation of the embossing rollers and heating circuit.
Figure 5:
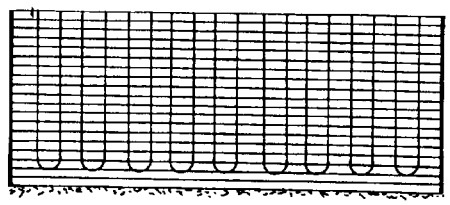
FIG. 5 is a side view of another embodiment of filter media in accordance with the invention.
Figure 6:
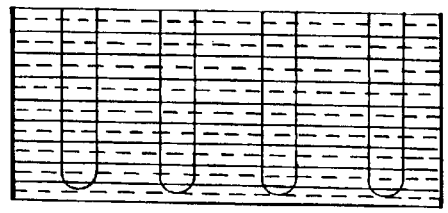
FIG. 6 is a side view in elevation of a further embodiment of filter media according to the invention.

Continuous manufacture of web-based media of the invention is illustrated in FIGS. 1–3. Non-polar, non-conductive webs 10 are fed into the nip 12 of heated rollers 14, 16. The rollers have relief surface 15 which embosses a pattern 17 of dots 18 on the laminated media 20 emerging from the heated rollers 14, 16. As shown in FIG. 4, the dots 18 extend substantially through the thickness of the media.

The rollers could be heated by other means such as resistance rods. However, heating the rollers by flowing heat exchange fluid through the rollers has been found to permit control of the temperature of the rollers to within ±2° F. The rollers are heated to the same temperature, usually to a temperature between 250° F. and 280° F. for melt blown polypropylene web.

The rollers 14, 16 are mounted on stands 30, 32 each containing bearing assemblies 34, 36. The rollers are driven by motors 38, 40. Heat exchange fluid such as thermal oil, is heated in heater 50 and is pumped into both rollers by pump 52 through inlets 54 and is returned to the heater 50 through outlets 56 which are connected to the inlet 58 to the heater 50. The maximum pressure capacity is 80 N/mm and the top speed range of the motors is 80 mi/min in the following examples.

Filters were prepared from melt blown polypropylene containing stacked webs of 40 and 60 grams per square yard material spot laminated according to the invention. They were compared to commercial glass microfiber filters using ambient 68.6° F. air having a humidity of 55° F. at a velocity of 105 ft/min (5.25 cm/s).

Figure 7:
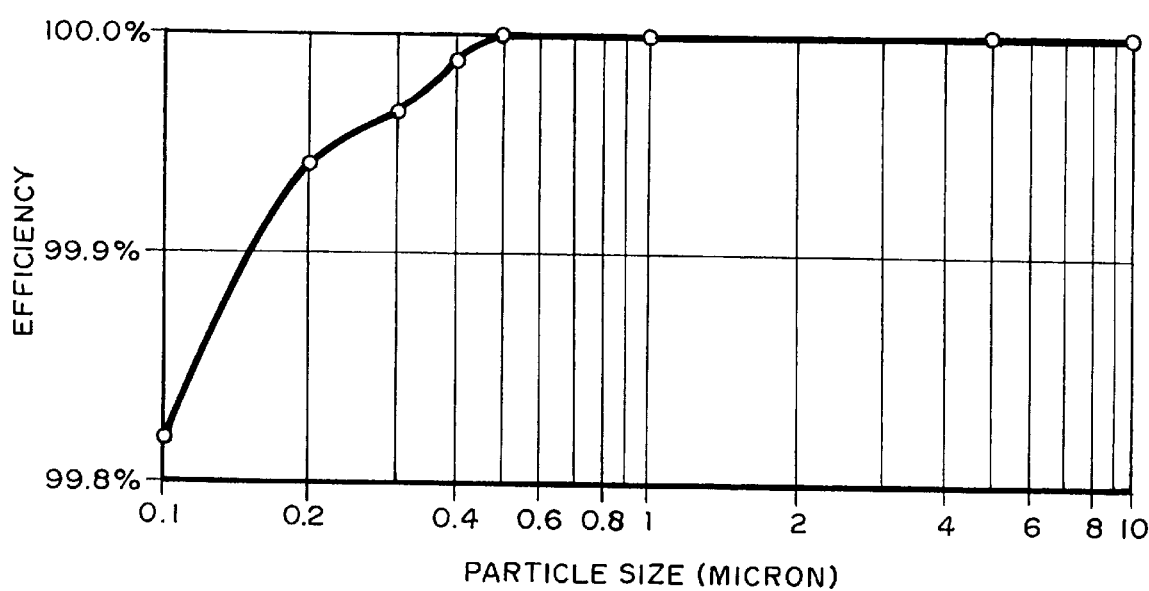
FIG. 7 is a graph showing efficiency of laminated filter media according to the invention.

The efficiency of media containing 4 layers of 40 gram per square yard material is shown in FIG. 7. The media is much thicker (1–5 mm) than glass media and permits depth versus surface loading of fine particles.

SAMPLE 1:

Shows the difference in a completed filter.
Example: Microfiberglass filter 24×24×12 inches nominal
Existing: 95% ASHRAE filters 70% at 0.30 micron Resistance to air flow 2000 CFM at 0.50 inch W.G.
Example: Composite layer filter 24×24×12 inches nominal 99.0% Laser tested 99.0% at 0.30 micron Resistance to air flow 2000 CFM at 0.50 inch W.G.

The average number of 0.30 micron particles counted with a laser particle counter is 500,000 in one minute. The difference in 70% and 99.0% per minute would be 145,000 0.30 micron particles with no extra energy costs.

SAMPLE 2:

Shows the difference of filter media in completed filters. Efficiencies versus Resistance.

| Existing microfiber glass Media Specifications | | Synthetic composites HEPA VS ULPA and Intermediate Eff. EFFICIENCY | RESISTANCE |
|---|---|---|---|
| MEDIA TYPE | GRADE | #at 0.30 micron x at 0.12 micron | at 10.5 (feet per minute) |
| Glassfiber | HEPA | #99.97% | 30 to 36mm |
| Synthetic Composite (model 4-40) | HEPA | #99.97% | 10mm |
| Glassfiber | ULPA | x99.999% | 42 to 80mm |
| Synthetic Composite (6 40/4 60) | ULPA | x99.999% | 15mm |
| Glassfiber | Intermediate Eff. | #99.0% | 17mm |
| Synthetic Composite | Intermediate Eff. | #99.0% | 6.0mm |
| Glassfiber | Intermediate Eff. | 95.0% | 14mm |
| Synthetic | Intermediate Eff. | #95.0% | 4.0mm |

The lamination of the different layers provides composites with high efficiencies and with a low resistance to air flow. The composites are up to two and a half times as thick as standard wet laid microfiberglass papers, which increases the dust holding capacity of the media and gives it longer life. This is due to depth loading of dust Vs surface loading as is the case in standard microfiberglass materials.

The method of manufacturing melt blown materials can leave the outer surfaces with a look of the fibers not adhered together (hairy). This is not desirable for a high efficiency filtration. What is desired is a smooth silk like surface In this invention, the matched, heated embossing rollers will adhere the layers by thermal bonding a dotted, possibly diamond shaped, pattern similar to patterns on paper towels. The controlled heating of the embossing rollers ever so slightly irons the surface that is not being embossed hence giving the material a smooth silk like look and feel, the manufactured loose fiber look. The method of the invention employs a combination calendar and embossing process. The laminating and the calendaring processes could be done separately.

Ultra-sonic welding of the layer could be substituted in the place of the thermal bonding/laminating step. With ultrasonic spot lamination the heat is localized, concentrated and only melts the fibers in the line with the dots on the roller. The dots can have a smaller diameter than those present on a heated lamination roller.

Figure 8:
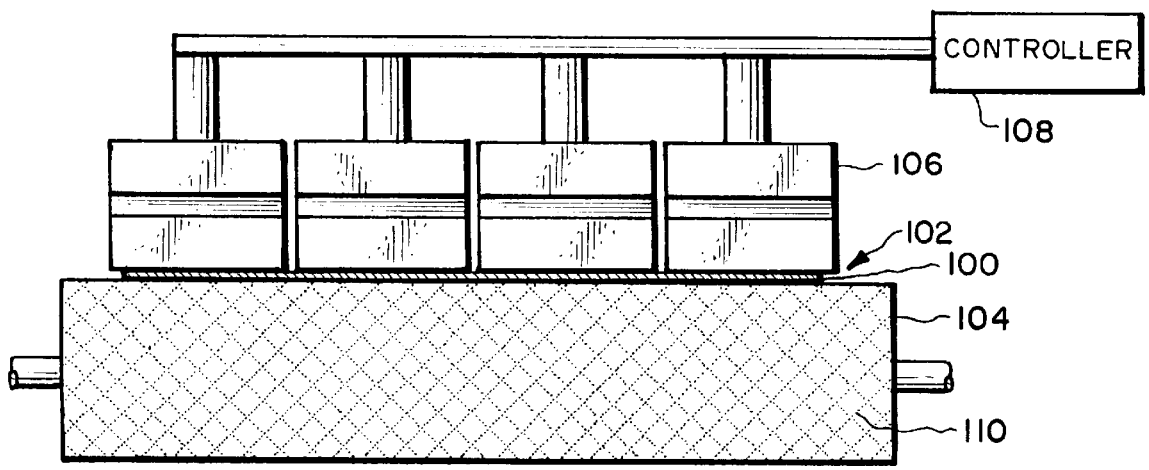
FIG. 8 is a front view in elevation of a system for spot laminating layers of electrostatic fabric to form a media.
Figure 9:
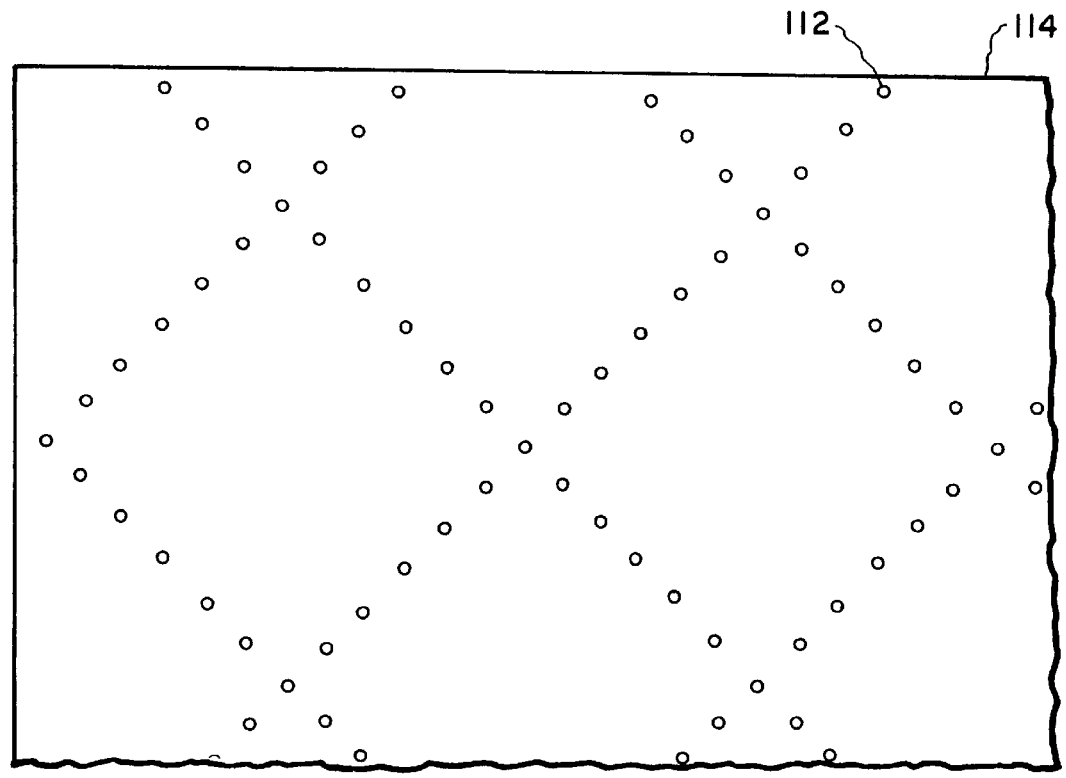
FIG. 9 is an enlarged, top view in elevation of the media prepared in the system of FIG. 8.

Spot lamination of an assembly of thermoplastic, organic, electrostatic, non-woven fabric is illustrated in FIGS. 8–9. The assembly 100 is formed of a plurality of layers of the fabric having a layer of lightweight thermoplastic scrim on each side of the assembly. The assembly 100 is fed into the nip 102 between patterned roller 104 and a set of ultrasonic generators 106. As the generators 106 powered by controller 108 heat the assembly to near the melting point of the fabric, the raised dots 110 on the roller 104 are pressed into the softened assembly and form a pattern of impression dots 112 on composite filter media 114.

The electrostatic fabric is formed of two different fibers which develop electrostatic charge when they rub each other during blending. The fabric is formed of a blend of fibers of an olefin polymer with fibers of a substituted olefin polymer carrying electro-negative substituents such as halogen or CN. The olefin polymer can be polyalkylene polymer formed by addition polymerization of an olefin such as ethylene, propylene butylene or their mixtures. The preferred olefin polymer is polypropylene. Examples of substituted addition polymers are polyvinyl chloride, polyvinylidine chloride, chlorinated polyvinyl chloride, polytetraflourethylene or modacrylic. A modacrylic is a copolymer containing 35 to 90 weight percent acrylonitrile, the remainder being a copolymerzible addition comonomer such as vinyl, vinylester, vinyl chloride or vinylidene chloride.

The preferred modacrylic fiber contains at least 40%, preferably at least 50% by weight of acrylonitrile, the balance being vinyl or vinylidene chloride. Commercially available modacrylic fibers contain 45% acrylonitrile/55% vinyl chloride/or 48% acrylonitrile/50% vinylidene chloride/ 2% third monomer to provide dye sites.

Both fibers are absent any lubrication, anti-static agent or other coating and are both preferably crimped. The ratio of the olefin fiber to the modacrylic fiber is from 30:70 to 80:20 based on surface area, usually from 40:60 to 70:30. The fibers are usually less then 100 micrometers in diameter, usually from 10–25 micrometers. The staple length is from 30 to 200 mm, preferably 40 to 100 mm.

The fibers are formed into a felt by carding the fibers into a fleece and needle punching the fibers to form a felt. The fibers become mixed and develop electrostatic charge during carding.

Technostat electrostatic media is commercially available. The media comprises a blend of polypropylene and modacrylic crimped staple fibers. The media is available in several densities stated as ounces per square yard (OPSY). Specification of several materials follow.

TABLE 1

| MEDIA | WEIGHT | THICKNESS |
|---|---|---|
| Technostat-90 | 3.0 +/− .5 OPSY | 0.75 +/− .015" |
| Technostat-150 | 4.5 +/− 0.5 OPSY | .090 +/− .015" |
| Technostat-250 | 7.0 +/− 1.0 OPSY | .130 +/− .202" |
| Technostat-300 | 9.0 +/− 1.0 OPSY | .145 +/− .020" |
| Technostat-400 | 12.0 +/− 1.0 OPSY | .155 +/− .020" |

| MEDIA | MINIMUM EFFICIENCY | MAXIMUM PENETRATION | MAXIMUM RESISTANCE |
|---|---|---|---|
| Technostat-90 | 90% | 10% | 1.0 |
| Technostat-150 | 97.00% | 3.00% | 2.0 |
| Technostat-250 | 99.93% | 0.07% | 4.0 |
| Technostat-300 | 99.97% | 0.03% | 5.0 |
| Technostat-400 | 99.99% | 0.01% | 6.0 |

A series of electrostatic fiber composites were prepared in the apparatus of FIGS. 8–9 utilizing stacks of different weights of Technostatic fabrics placed between end layers of 0.5 ounce per square yard polypropylene scrim. The spot lamination pattern was a one-inch diamond pattern. The final media was tested at an air flow resistance of 60 feet per minute with a Hiac Rayco bench model laser particle counter.

Results follow:

| Weight grams/sq. yard and number of layers of Technostat fabric | Resistance to air flow at 60 feet per minute | Efficiency and particle size Micron |
|---|---|---|
| 120 gram | .08 inches | 0.50/71.71% |
|  |  | 1.0/87.0% |
|  |  | 3.0/98.0% |
| 40 + 40 + 40 | .095 | 0.5/77.15 |
|  |  | 1.0/89.0% |
|  |  | 3.0/98.2% |
| 60 + 60 | .090 | 0.5/78.01% |
|  |  | 1.0/92.3% |
|  |  | 3.0/98.5% |
| 70 + 50 | .090 | 0.5/84.55% |
|  |  | 1.0/93.0% |
|  |  | 3.0/99.0% |
| 150 gram | .095 | 0.5/81.6% |
|  |  | 1.0/92.0% |
|  |  | 3.0/98.4% |
| 80 + 70 | .085 | 0.5/82.47% |
|  |  | 1.0/93.0% |
|  |  | 3.0/98.7% |
| 50 + 50 + 50 | .010 | 0.5/86.99% |
|  |  | 1.0/94.0% |
|  |  | 3.0/99.2% |
| 100 gram | .06 | 0.5/59.93% |
|  |  | 1.0/78.0% |
|  |  | 3.0/94.3% |
| 50 + 50 | .07 | 0.5/73.4% |
|  |  | 1.0/85.0% |
|  |  | 3.0/96.2% |

The testing again demonstrates that efficiency of composite electrostatic media increases by stacking different weights of media into an assembly and that resistance to air flow is minimized by spot welding the assembly. The efficiency not only increases at 3 micron (the standard for testing) but at all sizes of particles below 3 micron.

Fiber migration is minimized and edge sealing of the scrim is no longer necessary. The spot laminated assembly will greatly enhance use of electrostatic fiber media in medical applications and will also find other uses such as in the filtration of vacuum cleaner exhaust to retain small particles in the apparatus.

It is to be realized that only preferred embodiments of the invention have been described and that numerous substitutions, modifications and alterations are permissible without departing from the spirit and scope of the invention as defined in the following claims.

I claim:

1. A method of forming an electrostatic filter media comprising the steps of:

forming a stack of 2–20 layers of randomly charged, organic, thermoplastic, electrostatic media consisting essentially of non-woven web of melt-blown fibers of a polyolefin containing 2–8 carbon atoms;

each layer having the same density and having an inner face-directly in contact with an opposed inner face of another layer;

the uppermost layer of the stack having an outer face directly exposed to air incoming into the media, the lowermost layer of the stack having an outside face directly exposed to air exiting the media;

each layer having a weight of 5–100 gr/sq.yd.; and sonically and thermally spot laminating the stack under pressure by passage between the nip of a spot patterned heated roller and an ultrasonic generator to adhere said layers together, said spots having a diameter less than ¼ inch and occupying no more than 5% of the surface of the media.

2. A method according to claim 1 further including the step of adding a sheet of lightweight thermoplastic scrim having an inner face directly in contact with at least one outer face of the stack before spot laminating the layers.

3. A method according to claim 1 in which the polyolefin is polypropylene.

4. A method according to claim 2 in which the scrim is a spun bonded material having a weight from 0.5 to about 4 ounces per square yard.

5. A method according to claim 4 in which a layer of scrim is present on both outer faces of the stack.

6. A method according to claim 4 in which the scrim is a spun bound polypropylene.

7. A method according to claim 2 in which the spots are placed at least ¼ inch apart.

8. A method according to claim 1 in which the diameter of the spots is no more than 1/16 inch and the spots occupy no more than 2% of the surface of the media.

9. A method according to claim 8 in which the spots are disposed in lines with the spots spaced at least ¼ inch apart.

10. A filter according to claim 1 in which the melt blown web comprises polypropylene.

11. A high efficiency electrostatic filter consisting essentially of in combination:

a stack of from 2–20 layers of organic, non-woven, randomly charred electrostatic media, each layer consisting essentially of melt-blown fibers of a polyolefin containing 2–8 carbon atoms;

each layer having the same density, and having an inner face-directly in contact with an opposed inner face of another layer;

the uppermost layer of the stack having an outer face directly exposed to air incoming into the media, the lowermost layer of the stack having an outside face directly exposed to air exiting the media;

each layer having a weight of 5–100 gr/sq.yd.;

a sheet of lightweight, thermoplastic scrim having an inner face and an outer face disposed on outer surfaces of the uppermost and bottom most layers of the stack to form an assembly having a longitudinal axis; and a pattern of laminating spots extending normal to said axis substantially through said assembly, holding the layers and sheets of scrim together to form a filter, said spots having a diameter of less than about ¼ inch and said spots occupying no more than 5% of the surface of the filter.

12. A filter according to claim 11 in which the diameter of the spots is no more than 1/16 inch and the spots occupy no more than 2% of the surface of the media.

13. A filter according to claim 12 in which the spots are formed in lines with the spots spaced at least ¼ inch apart.

14. A method of manufacturing a high efficiency filter media comprising the steps of:

forming a stack of layers of spun bound, organic, thermoplastic, electrostatic, polyolefin material, each layer having the same density and weight between 5–100 gr/sq.yd.; and spot laminating the stack to adhere said layers together, by passing the stack in the nip between a spot patterned roller and an ultrasonic generator, said spots having a diameter less than 1/16 inch and occupying no more than 2% of the surface of the media, said stack containing at least one layer differing in weight from other layers in the stack by at least 20%.

* * * * *